INVENTOR
RAFFAELE DI PIETRO

BY Hopgood & Calimafde
ATTORNEYS

# United States Patent Office 3,506,009
Patented Apr. 14, 1970

3,506,009
METHOD OF MAKING MEDICAL STICKS
Raffaele Di Pietro, Rome, Italy, assignor to Societa Farmeuropa—Fedip, Rome, Italy
Filed Mar. 3, 1967, Ser. No. 620,355
Int. Cl. A61b *19/00;* A61j *3/80;* A61m *7/00*
U.S. Cl. 128—267        6 Claims

ABSTRACT OF THE DISCLOSURE

Styptic-tipped sticks, in the form of matchbooks, are formed by heating a medicinal mixture sufficient to fluidize it, homogenizing the mixture by agitating it with an apertured disc reciprocated perpendicularly to the plane of the disc, dipping the sticks a plurality of times in the mixture to form a stratified tip, and then drying the sticks in hot air.

---

This invention relates generally to a method of making a therapeutic, hygienic and like medicinal products having an emollient, anti-inflammatory, antiallergic, disinfectant or astringent effect, and in particular, to disposable products of the delineated type.

It is the object of this invention to provide a method of making a pharmaceutical product in adequate supply to care for personal needs, yet sufficiently small to be carried or stored conveniently, and adaptable to hand use or application.

It is a further object of this invention that notwithstanding its small size the product be manually manipulatable with ease to facilitate its application.

It is a still further object of this invention to provide a method for the manufacture of such products which is feasible both economically and practically, and which provides a maximum quantity of the product in minimum space.

Briefly, the invention contemplates medicinal sticks in the form of a "matchbook"; the medication replacing the match tip and being applied by removing and using one stick at a time, as necessary.

While a number of conventional methods for manufacturing matches in book or individual form is available, these processes do not directly concern themselves with the unique problems inherent in coating a stick tip with a pharmaceutical produce (such as alum, an astringent crystalline substance for cuts) which includes the necessity of obtaining constant temperature solution unencumbered by surface coagulation, and achieving a desired shape without trapping moisture internally, which would give the resultant product an extremely short shelf life.

The above mentioned and other features and objects of this invention and the manner of attaining them will become more apparent and the invention itself will best be understood by reference to the following description of an embodiment of the invention taken in conjunution with the accompanying drawings wherein.

Figure 1:
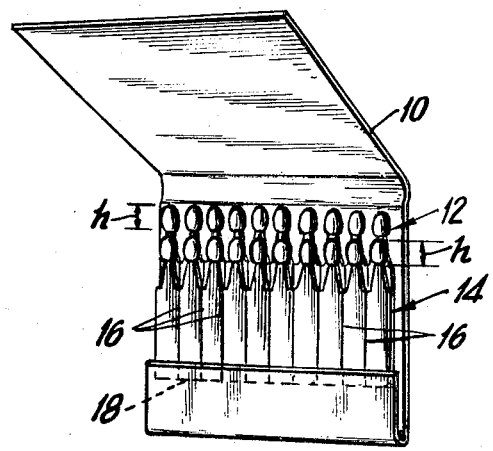
FIG. 1 is a perspective illustration of a therapeutic book of disposable alum sticks made in accordance wtih the invention.

Turning now to the invention, and in particular, to FIG. 1, there may be seen a book comprising a cover 10 folded in conventional matchbook manner and embracing conventional rows 12 and 14 of wooden cardboard or other rigid material sticks having preformed longitudinal and transverse scorings (16 and 18) to facilitate the detachment of each stick from the book. As shown, each stick is tapered at its end to maximize the availability of the therapuetic material while minimizing possible doubling (coupling of adjacent sticks during the manufacturing process). Since a variety of conventional arrangements for achieving the foregoing are well known, and such methods are not directly related to this invention, they will not be described further.

For purposes of explanation, it has been chosen to describe a method for making styptic sticks which may be employed to contract organic tissue and check hemorrhaging most often resulting from razor nicks.

In accordance with the invention, a mixture is made including a base of alum, sodium perborate, glycerin and water in an amount sufficient to fluidize the mixture of these raw materials.

Figure 2A:
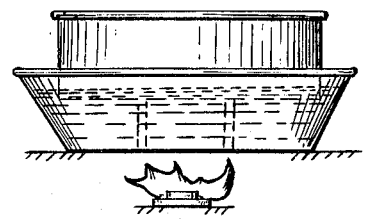
FIGS. 2a, 2b and 2c show respective steps in preparing an alum mixture for dipping.
Figure 2B:
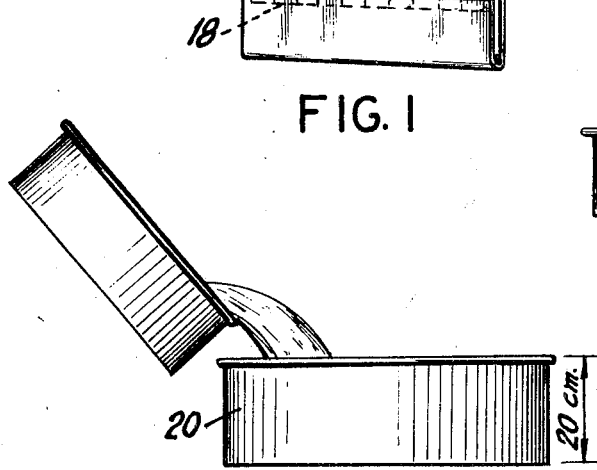
Figure 2C:
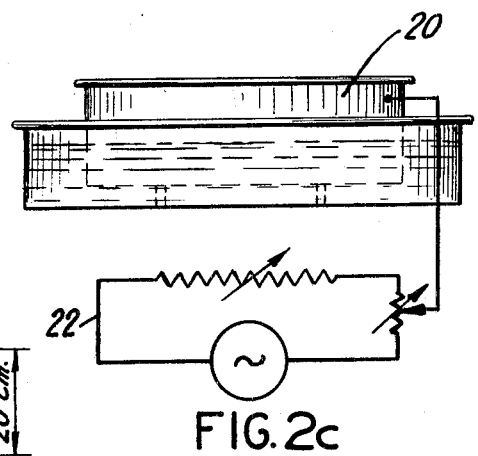

The mixture is melted (FIG. 2a) on a water bath (to insure temperatures not gerater than the boiling point of water) and thereafter discharged (FIG. 2b) into a suitable brass vessel 20 having a height of the order of 20 centimeters. The brass vessel 20 is immersed in an oil bath as shown in FIG. 2c and maintained at a temperature of 120 degrees centigrade by a thermostatically controlled heat source 22.

As the temperature of the mixture rises, the relative fluidity increases and it becomes necessary to maintain the molten mass in continuous motion to prevent the formation of a viscous surface coat which would preclude an effective stick dipping process to take place. Continuous movement of the mass has further been found to enhance homogeneity giving the greatest possible uniformity to the mass.

Figure 3A:
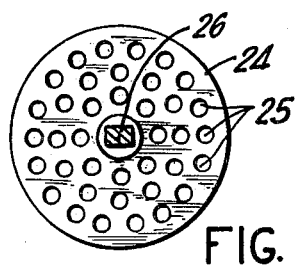
FIGS. 3a and 3b show an agitating disc and a portion of the agitating mechanism respectively utilized in connection with the inventive process.
Figure 3B:
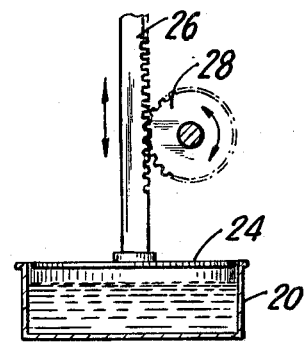
Figure 4:
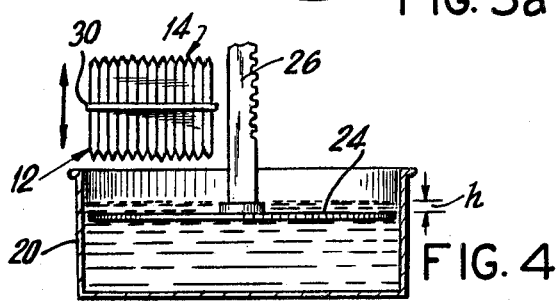
FIG. 4 illustrates the relative disposition of the stick rows to the bath.

In order to effect this homogeneity, a copper disc 24 of a diameter substantially the same as the inside diameter of the vessel 20 is provided a plurality of apertures 25. The disc is, as shown in FIG. 3b, affixed to a rack 26 which is reciprocated in a direction normal to the disc by the pinion gear 28 driven in any conventional manner. The disc 24 is preferably permitted vertical excursions reaching at the lowermost position the bottom of the vessel 20, and at the uppermost position approximately one millimeter above the surface of the mixture. As will be apparent to those skilled in the art, this agitating action by the disc produces eddy currents which homogenize the mixture.

The disc also serves the function of determining the depth to which the sticks may be immersed. As also shown in this figure, the front and back of stick rows 12 and 14 are inverted with respect to one another and gripped by frame member 30 which sandwiches the nonfunctional stick ends and imparts, by virtue of apparatus not shown, a reciprocating motion to be described.

The lowermost stick group is brought opposite the mixture normal to the surface thereof and is then lowered until the points of the sticks touch the disc 24. In this manner, the height of the stick's medicinal head "*h*" is determined by the surface displacement of the copper disc 24. In accordance with the invention a plurality of dippings takes place for each group of sticks thereby forming the tip or head in a plurality of strata, each layer being applied after the previous one has solidified or set. Needless to say, the dipping rate depends upon the viscosity of the fluid and the desired shape of the head. It has been found that the direction of the movement of the frame member 30 (and thus of course the sticks) as well as the rate of dippings, determines the shape of the head, and that a constant rate aids in breaking up surface films which tend to form on the bath during periods when disc 24 is quiescent. It is such surface film which causes the previously mentioned doubles to form.

It has been found desirable that in order to maximize the content of each tip, a spherical head be effected. The sequence best suited for achieving such a head in a plurality of dippings is as follows:

(1) Dipping without horizontal motion;
(2) Dipping with forward motion (out of the paper in the figure);
(3) Dipping with rearward movement (into the paper in the figure);
(4) Dipping with movement to the right;
(5) Dipping with movement to the left;
(6) Dipping without horizontal movement, and so on until the head is the desired diameter. Having thus completed the tipping of the lowest sticks, the frame member 30 is inverted and the sequence of dipping repeated for the new lower set of sticks.

Finally, the tipped rows, still sandwiched by frame member 30, are passed through hot air dryers and dried for 24 hours. This amount of time has been found sufficient to obtain the characteristic milk white alum appearance. After drying the heads, the books are assembled in a procedure similar to that commonly used for matchbooks.

When the nature of the mixture is of course changed depending upon the pharmaceutical product, the described method may be employed save for variations in the bath viscosity, the head drying time, etc. Thus, for example, an alternative embodiment of a medical stick according to the invention might consist of a mixture of substances of anti-allergic and pain-killing nature for use in the treatment of insect bites.

While the principles of the invention have been decribed in connection with specific apparatus, it is to be clearly understood that this description is made only by way of example and not as a limitation to the scope of the invention as set forth in the objects thereof and in the accompanying claims.

What is claimed is:
1. The method of stypically tipping a row of sticks comprising the steps of:
  forming a sufficiently fluid and viscous mixture having said styptic as a base;
  agitating said mixture sufficiently to break any surface film and insure homogeneity;
  dipping said sticks in said mixture at a predetermined rate in order to stratify said mixture thereon;
  and subjecting said sticks to a drying medium.
2. The method claimed in claim 1 wherein said sufficiently fluid and viscous mixture includes alum, glycerine, and water is formed at a temperature of approximately 120 degrees centigrade.
3. The method claimed in claim 1 wherein said mixture is agitated by a normally reciprocating horizontal disc having a plurality of apertures therein.
4. The method claimed in claim 3 wherein said disc is set to a predetermined depth in said mixture during the dipping process to thereby determine the length of the stick head.
5. The method claimed in claim 4 wherein predetermined movements are imparted to said sticks during the dipping process in order to obtain the desired head shape.
6. The method of making the styptic-tipped sticks comprising the steps of:
  heating a mixture of alum, sodium perborate, glycerin and water sufficient to fluidize the mixture;
  agitating said mixture in order to obviate the formation of any surface films thereon and achieve homogeneity;
  dipping said sticks a plurality of times into said mixture in order to form a stratified tip on said sticks;
  and drying said sticks in a reduced humidity atmosphere, for a period sufficient to produce the characteristic milk white color of alum.

References Cited
UNITED STATES PATENTS

| | | | |
|---|---|---|---|
| 2,782,461 | 2/1957 | Esslinger | 264—284 |
| 3,327,706 | 6/1967 | Watson | 128—267 |
| 3,388,203 | 6/1968 | Meininger et al. | 264—203 |

ADELE M. EAGER, Primary Examiner

U.S. Cl. X.R.
128—1, 260